Patented July 17, 1951

2,560,573

UNITED STATES PATENT OFFICE 2,560,573

DRYING OF BULK PRODUCTS

Arnold H. Heineman, Chicago, Ill., assignor, by mesne assignments, to Guardite Corporation, Wilmington, Del., a corporation of Delaware No Drawing. Application March 22, 1946, Serial No. 656,519

5 Claims. (Cl. 34—15)

This invention relates to the drying of bulk products, preferably under vacuum.

In drying materials in bulk it is difficult to control the final moisture content because, while the initial moisture content can frequently be determined, it is difficult to take proper samples and the accurate determination of moisture content involves considerable time. Therefore, the process cannot be interrupted for the taking of samples and it is customary now to employ rule of thumb procedures for control.

The present invention provides a simple means of producing a given moisture content, whether under vacuum, and whether or not in an atmosphere of steam.

The control of the present invention is carried out by first determining the initial moisture content of the product to be dried in any known manner. The specific heat of the product is also determined, either by test or from the literature. The product is then heated by any suitable means, such as induction heating, steam coils or other means which do not increase the moisture content of the product, or by the use of superheated steam directly applied to the product if it is known by experiment how much moisture will be added by such treatment. The amount of heating is predetermined by calculation, knowing the amount of water which it is desired to remove, and the specific heat of the product. The pressure is then lowered upon the material until the temperature has dropped sufficiently to lower the moisture content of the product through evaporation to the desired degree. Inasmuch as the evaporation of 1% of moisture will cool a product of given specific heat a precise number of degrees, the evacuation is stopped when the product has reached the temperature representing the desired drop in moisture content.

Heating is, of course, stopped during the evacuation phase, although if the heat input is known, heating may be continued and allowed for in the calculations.

While the calculations involved are obvious to any chemical engineer, the following assumptions will illustrate a typical calculation. Assume a product having a known moisture content of 20%, a desired end moisture content of 15%, a specific heat such that the abstraction of 1% of moisture by evaporation will reduce the temperature of the product 25° F. The product is then heated 125° higher than the desired final temperature (which is preferably room temperature), this figure being arrived at by multiplying 25° by 5, the latter being the per cent of moisture to be removed. Assuming a room temperature of 70° F., therefore, the product will be heated to 195° F. and a vacuum produced and increased until the product has fallen to 70° F., at which time it will have the proper moisture content of 15%.

Heating may be continued during the evacuation providing the heat input is metered and taken into effect in the calculations. For example, in the above calculations if enough heat were added during evacuation to compensate for a fall in temperature of 25°, the product need only be heated to 170° F.

The process may, of course, be divided into stages, the heating and evacuation being repeated.

Evacuation is normally quite rapid, so that the flow of heat from the product by radiation or conduction or convection is negligible.

The whole process may be carried out in a vacuum chamber, or more than one chamber may be employed.

It is preferred that the evacuation be carried at progressively decreasing pressures and normally the final pressure will be below one inch of mercury absolute.

The foregoing detailed description has been given for clearness of understanding only, and no unnecessary limitations should be understood therefrom.

What I claim as new, and desire to secure by Letters Patent, is:

1. The method of drying which comprises predetermining the moisture content of a material to be dried, predetermining the desired moisture content of the material, determining in degrees the cooling produced by evaporation of 1% of moisture from the material, multiplying the difference between said moisture contents by the said degrees of cooling to obtain a product, applying heat to the material to increase its temperature and subjecting the material to an increasing vacuum until the temperature of the material has decreased a number of degrees equal to said product.

2. The method of claim 1 in which heat is applied to said material without substantially increasing its moisture content.

3. The method of drying which comprises predetermining the moisture content of a material to be dried, predetermining the desired moisture content of the material, determining in degrees the cooling produced by evaporation of 1% of moisture from the material, multiplying the difference between said moisture contents by said cooling, applying heat to the material to increase its temperature the number of degrees equal to said product and then subjecting the material to a vacuum rapidly to decrease its temperature the last determined number of degrees.

4. The method of claim 1 in which the final temperature is about 70° F.

5. The method of reducing the moisture content of material by a specific desired percentage which comprises heating the material to raise its temperature a number of degrees equal to the product of the desired percentage reduction in moisture content times the number of degrees heat drop in the material for each 1% reduction in moisture content by evaporation, and subjecting the material to an increasing vacuum until evaporation has reduced the temperature thereof by a number of degrees equal to said product.

ARNOLD H. HEINEMAN.

REFERENCES CITED

The following references are of record in the file of this patent:

UNITED STATES PATENTS

| Number | Name | Date |
| --- | --- | --- |
| 1,250,496 | Passburg | Dec. 18, 1917 |
| 1,778,079 | Kristensson | Oct. 14, 1930 |
| 2,086,446 | Smith, Jr., et al. | July 6, 1937 |
| 2,132,095 | Broughton | Oct. 4, 1938 |
| 2,227,634 | Dalin | Jan. 7, 1941 |
| 2,295,745 | Merriam | Sept. 15, 1942 |
| 2,391,441 | Baer | Dec. 25, 1945 |